United States Patent [19]
Koepff et al.

[11] Patent Number: 5,733,994
[45] Date of Patent: Mar. 31, 1998

[54] BIODEGRADABLE, WATER-RESISTANT POLYMER MATERIAL

[75] Inventors: Peter Koepff, Heidelberg; Klaus Bräumer; Wilfried Babel, both of Eberbach, all of Germany

[73] Assignee: Deutsche Gelatine-Fabriken Stoess AG, Germany

[21] Appl. No.: 756,542

[22] Filed: Nov. 26, 1996

Related U.S. Application Data

[63] Continuation of Ser. No. 307,800, filed as PCT/EP93/00563 Mar. 11, 1993, published as WO93/20119 Oct. 14, 1993, abandoned.

[30] Foreign Application Priority Data

Mar. 30, 1992 [DE] Germany .................. 42 10 334.7

[51] Int. Cl.$^6$ ............................................ C08G 63/06
[52] U.S. Cl. .................. 527/207; 527/311; 527/313; 527/314
[58] Field of Search ..................... 527/207, 311, 527/313, 314

[56] References Cited

U.S. PATENT DOCUMENTS

| | | |
|---|---|---|
| 2,548,520 | 4/1951 | Damschroder et al. . |
| 2,853,457 | 9/1958 | Gates et al. . |
| 3,837,861 | 9/1974 | Rakoczy . |
| 4,663,163 | 5/1987 | Hou et al. .................. 424/101 |
| 5,059,654 | 10/1991 | Hou . |

FOREIGN PATENT DOCUMENTS

| | | |
|---|---|---|
| 49900/90 | 9/1990 | Australia . |
| 338 534 | 10/1975 | Austria . |
| 2140541 | 6/1972 | France . |
| 62-54253 | 3/1987 | Japan . |
| 62-54254 | 3/1987 | Japan . |

*Primary Examiner*—Duc Truong
*Attorney, Agent, or Firm*—Leydig, Voit & Mayer, Ltd.

[57] ABSTRACT

A novel biodegradable, water-resistant polymer material which can be produced with defined material properties is suggested, in particular in the form of foils, films, strips, masses, molded articles or the like, this material consisting essentially of a product of the cross-linking reaction of polysaccharides and/or polypeptides, the hydroxyl, amino, imino, thiol and/or carboxyl groups of which are derivatized at least partially in a non-radical reaction with agents which include groups cross-linkable in a process step following the derivatization and separate therefrom.

25 Claims, No Drawings

BIODEGRADABLE, WATER-RESISTANT POLYMER MATERIAL

This is a continuation of application Ser. No. 08/307,800 filed on Sep. 26, 1994, published as WO93/20119 Oct. 14, 1993 now abandoned.

The invention relates to a biodegradable, water-resistant polymer material, in particular in the form of foils, films, strips, masses, molded articles or the like.

The processes so far described in the literature for producing water-resistant polymers on the basis of natural polymer materials, such as, e.g., gelatin or glue, are limited to the procedure of the graft copolymerization (radical reaction) of unsaturated compounds or mixtures of unsaturated compounds in the presence of biopolymers. The result of these processes is product mixtures consisting of graft copolymers, homopolymers or copolymers without a gelatin portion and non-modified gelatin, which have little to characterize them and are an impediment to any reliable and reproduceable technical application due to varying product compositions.

The object of the present invention is to propose a polymer material which can be produced with defined material properties.

This object is accomplished in accordance with the invention by a biodegradable, water-resistant polymer material which is produced by means of a process having the following steps:

a) at least partially derivatizing polysaccharides and/or polypeptides at their hydroxyl, amino, imino, thiol and/or carboxyl groups in a non-radical reaction with an agent including cross-linkable groups to form an uncrosslinked reaction product and b) converting the uncrosslinked reaction product from step a) to form a product of cross-linking reaction by cross-linking the cross-linkable groups.

The biodegradable, water-resistant polymer material of the invention is therefore a material which consists essentially of a product of the cross-linking reaction of polysaccharides and/or polypeptides, the hydroxyl, amino, imino, thiol and/or carboxyl groups of which are derivatized in a non-radical reaction at least partially with agents which include groups that can be cross-linked in a process step which follows the derivatization and can be performed separately.

Whereas in the case of the graft copolymerization a derivatization reaction and a cross-linking reaction of the reagents used for the derivatization take place parallel to one another and without any control relative to one another, the present invention chooses a two-stage production method, in which the aim is first of all to obtain a derivatized polysaccharide or polypeptide in a non-radical reaction. This can then undergo, if necessary with the addition of further monomers, a selective polyreaction which includes not only the polymerization but also the polycondensation and the polyaddition as reaction mechanisms.

The biodegradable, water-resistant polymer materials thus obtained may be adjusted exactly to suit their purpose of use with their properties. Depending on the choice of reaction conditions, such as substrate concentration, degree of derivatization and polymerization conditions, the water-insoluble or water-resistant but biodegradable polymers are obtained which may be used as molded articles, coatings, in particular as packaging materials, as well.

Due to their polar structural features (amino acids, saccharides), the high-molecular products are insoluble not only in hydrophilic media, such as, for example, water and alcohols or the like, but also in hydrophobic solvents, such as, for example, halogenated hydrocarbons, ethers, ketones etc., but still retain the property of being at least partially swellable in polar solvents.

Despite the derivatization and the cross-linking, these high-molecular biopolymers still have their original property of being degradable to form oligomeric and monomeric units by enzyme systems having a correspondingly aerobic or anaerobic effect, and in a time frame which allows composting of these polymer materials.

The cross-linkable groups preferably include acrylic and/or methacrylic residues.

Glycidyl acrylate and/or glycidyl methacrylate are suitable, in particular, as agents.

For the selection of the polypeptides, those of collagenic origin are particularly preferred, especially in the form of gelatin, animal glues, collagen or collagen hydrolysate. In addition, other bio-polypeptides can, however, also be used, such as, e.g. whey proteins and/or caseins, vegetable proteins, in particular soybean proteins, individually or in mixtures, also in mixtures with the polypeptides of collagenic origin.

The term gelatin is to be understood in the definition used here to cover not only products which have been obtained in accordance with the one-stage type A process but also those which have been obtained in accordance with the two-stage alkaline process and have a gelling power of 40 to 320 g (British Standard).

At the same time, unpurified, collagenic raw extracts in the form of hide or bone glues are suitable as starting materials for the production of high-molecular biopolymers. Non-gelling collagenic products, so-called collagen hydrolysates, which have been obtained from collagen-rich raw material such as hide or bones by physical (pressure, temperature), chemical (e.g. by means of acid or lye) or biological processes (enzymatic), are likewise suitable as starting material for the production of the inventive, high-molecular biopolymer materials. In order to attain an adequate water resistance, at least ten cross-linkable groups should be present on average per thousand monosaccharide or amino acid groups of the polysaccharide or polypeptide chains.

With respect to the polypeptide portion, it is preferable for the cross-linkable groups to be linked to the polypeptide chain essentially exclusively via amino and carboxyl groups.

It has proven to be favorable for various fields of use of the polypeptide materials when the cross-linkable groups of the polypeptide portion are linked to the polypeptide chain essentially exclusively via the carboxyl groups.

Generally, an adequate water resistance and tensile strength are observed in the polymer materials when, on average, up to 150 cross-linkable groups are present per thousand amino acids of the polypeptide chain.

If the polymer material is built up of a mixture of polysaccharide and polypeptide portions, these portions are preferably cross-linked with one another. Preferably, the cross-linking reaction is continued until the product of the cross-linking reaction is entirely water-insoluble. On the other hand, care is preferably taken that the product of the cross-linking reaction is still water-swellable within certain limits. Water-swellability facilitates the degradative reaction during the composting of the polymer materials.

To further modify the mechanical properties of the polymer materials, the cross-linking reaction can be produced in the presence of a free monomer and/or prepolymer of the agents. This means that the length of the bridges between two polymer molecules can be influenced and also, therefore, the structural composition of the polymer material itself.

The chemical and mechanical properties of the inventive polymer materials may be adjusted very accurately, particularly when parts of the functional groups of the polysaccharides and/or polypeptides are blocked with protective groups prior to the derivatization. In this case, protective groups customary in biochemistry can be used and these leave the desired functional groups selectively available for the derivatization.

In special cases, it has proven to be advantageous for such derivatization products to be used at least partially as derivatized polysaccharides and/or polypeptides, which include different cross-linkable groups, if necessary in the same molecular chain, which are accessible to different cross-linking reaction types.

This opens up the possibility of producing a cross-linked polymer material which can be completely cured in a later reaction or can undergo chemical reactions with other materials, at least at the boundary surface.

These and further advantages of the invention will be described in greater detail on the basis of the following examples.

DERIVATIZATION OF THE COLLAGENIC STARTING MATERIALS

The derivatization step of the collagenic starting materials described in the above includes their conversion into an aqueous solution in the concentration range of 1 to 70% by weight, whereby gelatins, dependent on their quality, are used preferably in concentrations of 1 to 30% by weight, glue from 10 to 40% by weight and non-gelling collagen hydrolysates from 20 to 70% by weight.

Reactive acrylates or methacrylates of the type glycidyl acrylate or glycidyl methacrylate preferably serve as modification reagents and these react at pH values of 4.0 to 10.0 specifically with γ-carboxyl or β-carboxyl groups of the amino acid side chains of glutamic acid and aspartic acid and with ε-amino acid chains of lysine and hydroxylysine.

The amount of the modification reagent is between 0.1 and 30% by weight (in relation to the polypeptide weight), preferably between 1 and 25% by weight (each time in relation to the polypeptide weight). Depending on the type of gelatin, the contents of the reactive groups of the gelatin which are available can vary:

Type A gelatin contains 85 mMol/100 g of acidic amino acid residues (glutamic and aspartic acid).

Type B gelatin contains, as a result of the deamination of glutamine or asparagine to glutamic acid or aspartic acid taking place during the alkaline conditioning of the collagen-containing raw material, 127 mMol of acidic amino acid residues per 100 g of gelatin.

The content of alkaline amino acid residues (lysine and hydroxylysine) is, with 38 mMol/100 g, the same in both gelatin types and is not altered by the alkaline treatment of the raw material (cf. "The Science and Technology of Gelatin", A. G. Ward, A. Courts Ed; Academic Press 1977).

The reaction temperature during the derivatization is preferably at 30° to 80° C., more preferably in the range of 40° to 60° C. The upper limit of the temperature ranges results from the fact that the increased tendency of the glycidyl reagent to hydrolyze to form diol at higher temperatures is to be avoided.

The corresponding esters are formed as reaction products in the case of the derivatization at the acidic amino acid side groups —in the case of the modification of the alkaline amino acid side groups the corresponding 1.3-alkanolamine derivatives between the polypeptide-linked reaction partners and the reactive acrylates or methacrylates.

In the following, the process for producing the inventive polymer materials by means of two separate steps, the derivation and copolymerization, will be described in greater detail on the basis of a general reaction scheme:

REACTION SCHEME

DERIVATIZATION:

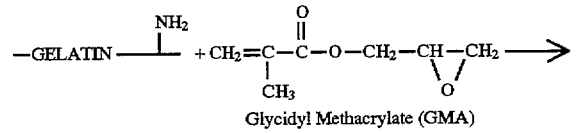
Glycidyl Methacrylate (GMA)

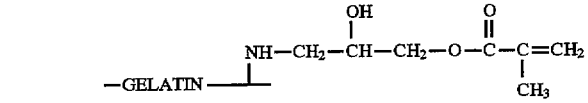

or

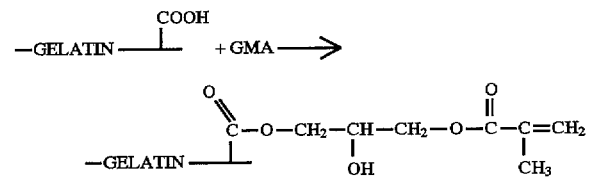

COPOLYMERIZATION:

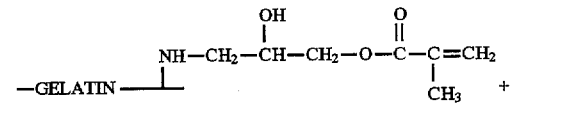

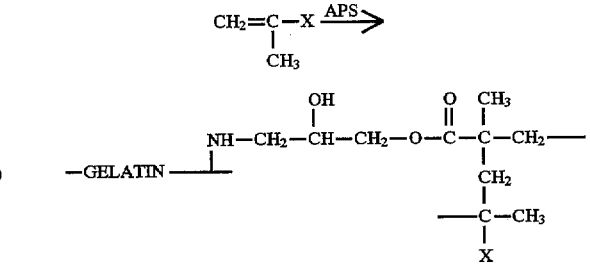

APS = $(NH_4)_2S_2O_8$
X = functional group of the monomer, eg: gelatin — GMA

The outlined reaction scheme for producing inventive biopolymer materials clearly explains the selective producibility of the inventive polymer materials whereas in the graft copolymerization a plurality of different reaction products result due to its radical reaction mechanism, to form a complex reaction product mixture.

The inventive, two-stage process of the derivatization and separate polyreaction for cross-linking the derivatized biopolymers opens up diverse possibilities for the selective, specially tailored synthesis of water-resistant polymers on the basis of callogenic starting materials or on the basis of polysaccharides or mixtures of the two.

Depending on the pH conditions and degrees of derivatization of 25% by weight maximum (in relation to the polypeptide or polysaccharide weight) selected for the modification, water-soluble products are obtained which can be converted immediately or after drying and by way of suitable polymerization processes, such as redox, thermal or UV treatment, to form water-insoluble but still swellable products, such as foil strips and molded articles.

Due to the dilutability with water and the compatibility of the aqueous solutions of gelatins, glues or hydrolysates, which are modified with glycidyl acrylate or glycidyl methacrylate, prior to the polymerization with several organic solvents, such as acetone, alkanols and polyols (content of dissolved products up to approximately 50% by weight), manifold coating and gluing tasks in the field of paper, paperboard, wood, synthetic materials and metal can be realized alone or in combination with additional latices.

The main structural element of the water-insoluble, high-molecular products described consists of protein or polypeptide chains and/or polysaccharides; the products produced therefrom are biodegradable due to the proteolytic action of microorganisms having aerobic and anaerobic effects.

All standard processing techniques, such as spraying, rolling, casting, knife application, are suitable for the application of the aqueous, not yet polymerized solutions or dispersions of gelatin acrylate or gelatin methacrylate. The same applies for the inventive polysaccharide systems. Additional comonomers are suitable for further modifying the product properties of the high-polymer compounds with the following aims:

hydrophobing: acrylic acid ester, methacrylic acid ester cationizing: trimethylammonium propyl methacrylamide chloride anionizing: acrylic acid, methacrylic acid

EXAMPLE 1

1. 100 g of type B gelatin (bones 270 bloom) are dissolved with 900 g of water at 50° C., the pH value is set to 8.5 with 1n of NaOH and 4.45 ml of glycidyl methacrylate (GMA) added under stirring and stirred for 1 h at 50° C. This amount of GMA corresponds to the content of 38 mMol of lysine and hydroxylysine/100 g of gelatin, i.e. theoretically a molar conversion (in relation to content of lysine and hydroxylysine). After stirring for one hour at 50° C., the pH value is set to 7.0 by adding 2n of $H_2SO_4$. The gelatin solution can, when required, be desalted, concentrated and dried or polymerized with suitable methods (ion exchange, membrane filtration inter alia).

EXAMPLE 2

Procedure as in Example 1, but using type A gelatin (250–300 bloom).

EXAMPLE 3

300 g of type B gelatin (bones 100 bloom) are dissolved with 700 g of water at 50° C.; the pH value is set at 8.5 with 1n of NaOH and 13.35 ml of glycidyl methacrylate added under stirring (equimolecular batch in relation to theoretical content of lysine and hydroxylysine) and stirred for 1 h at 50° C. Further processing as in Example 1.

EXAMPLE 4

Procedure as in Example 3, but with type A gelatin (100 bloom).

EXAMPLE 5

A 50% collagen hydrolysate solution ("Gelita-Sol" of Deutsche Gelatine-Fabriken Stoess AG) is set to pH 8.5 at 50° C. with 1n of NaOH and 5% by weight of glycidyl methacrylate added under stirring and stirred for 1 h at 50° C. Subsequently, the pH value is set to 7.0 with 2n of $H_2SO_4$. The modified protein solution can, with or without previous desalting, be dried (spray drying, lyophilization) or polymerized.

EXAMPLE 6

The protein solutions produced according to Examples 1 to 5 are mixed at 70° C. with 0.5% by weight of $Na_2S_2O_8$ (as a 10% aqueous solution)—water-insoluble polymer gels having different strengths are formed within 0.5 to 2 minutes.

EXAMPLE 7

The gelatin solutions produced according to Examples 1 to 4 are mixed with 0.25% by weight of a suitable UV initiator (e.g. Irgacure 651 of Ciba-Geigy as a 10% solution in acetone), applied with a knife device as a wet layer 100–500 µm thick onto inert carrier foils, such as polyester, polymethacrylate, and exposed to ultraviolet light for 2 minutes (type Heraeus NN 1544 VK, 15 W). After drying, transparent, water-insoluble films result.

EXAMPLE 8

Extremely flexible, water-insoluble foils result by adding polyols (glycerine, sorbite, polyethylene glycol) as softeners to the pouring solutions from Example 7 in a concentration of 10 to 40% (in relation to gelatin weight).

EXAMPLE 9

600 g of waxy maize starch (high amylopectin content; type Amioca AJH-504 of National Starch) are suspended at 50° C. in a solution of 120 g of $Na_2SO_4$ and 800 ml of water. The pH value is set at 10.5 to 11.0 by adding a 50% NaOH. To attain a starch degree of substitution (DS) of 0.03—i.e. 1% of the free hydroxyl groups of the anhydroglucose units present in the starch—13 ml of glycidyl methacrylate are slowly added. Following a reaction time of 2 hours at 50° C., the pH value is lowered to 7.0, the starch is filtered by suction, subsequently washed with water several times and dried in the circulating dryer cabinet at 40°–45° C.

EXAMPLE 10

10 g of the waxy maize starch produced according to Example 9 and modified with glycidyl methacrylate are pregelatinated for 30 minutes at 70° C. as a 10% aqueous dispersion and homopolymerized during stirring with 0.5% $Na_2S_2O_8$ (in relation to batch). After approximately 5 minutes the viscosity increases drastically—after a further 5 minutes the highly viscous batch can no longer be stirred.

EXAMPLE 11

10 g of the waxy maize starch produced according to Example 9 and modified with glycidyl methacrylate is slowly stirred into 10 g of the type A, 270 bloom gelatin modified with glycidyl methacrylate in accordance with Example 2. The copolymerization is started by adding 10 ml of an aqueous, 10% $Na_2S_2O_8$ solution. After approximately 5 minutes stirring, a water-insoluble polymer gel is formed.

EXAMPLE 12

The high-molecular biopolymers produced according to Examples 6 to 11 are biodegradable in an in vitro test procedure: Foils or granulates are incubated in 0.1% HCl at 37° C. with 2% by weight of pepsin. Depending on the degree of derivatization and polymerization conditions, the polymer substances have completely dissolved within 2 h to 7 d.

EXAMPLE 13

The decayability of high-molecular, water-resistant biopolymer foils (produced by ultraviolet curing of a bone gelatin foil of 270 bloom, derivatized with 5% by weight of GMA) can be documented by a practical test: A test strip is covered in a standardized leaf mold and incubated at 40° C.; after 4 weeks the foil had decomposed without residue.

We claim:

1. Biodegradable, water resistant polymer material formed in a layer or film of predetermined thickness and produced by a process comprising the steps of
   a. at least partially derivatizing polysaccharides and/or polypeptides at their hydroxyl, amino, imino, thiol and/or carboxyl groups in a non-radical reaction with an agent including cross-linkable groups to form an uncross-linked reaction product and
   b. converting the uncross-linked reaction product to form a product of cross-linking reaction by cross-linking the cross-linkable groups, wherein
   c. said material biodegrades within a reasonable length of time.

2. Polymer material as defined in claim 1, wherein the cross-linkable groups include acrylic and/or methacrylic residues.

3. Polymer material as defined in claim 2, wherein the agent includes glycidyl acrylate and/or glycidyl methacrylate.

4. Polymer material as defined in claim 1, wherein the polypeptides are of collagenic origin, in particular gelatin, animal glues, collagen or collagen hydrolysate and/or whey proteins, caseins, vegetable proteins, in particular soybean proteins.

5. Polymer material as defined in claim 1, wherein on average at least 10 cross-linkable groups are present per 1000 monosaccharides or amino acids of the polysaccharide or polypeptide chains, respectively.

6. Polymer material as defined in claim 1, wherein the cross-linkable groups of the polypeptide portion are linked to the peptide chain almost exclusively by amino and carboxyl groups.

7. Polymer material as defined in claim 1, wherein the cross-linkable groups of the polypeptide portion are linked to the polypeptide chain almost exclusively by carboxyl groups.

8. Polymer material as defined in claim 5, wherein on average up to 150 cross-linkable groups are present per 1000 amino acids of the polypeptide chain.

9. Polymer material as defined in claim 1, wherein the polysaccharide portions are cross-linked with the polypeptide portions.

10. Polymer material as defined in claim 1, wherein the cross-linking reaction is continued until the product of cross-linking reaction becomes water-insoluble.

11. Polymer material as defined in claim 1, wherein the product of cross-linking reaction swells in water.

12. Polymer material as defined in claim 1, wherein the cross-linking reaction takes place in the presence of a free monomer and/or prepolymer of the agent.

13. Polymer material as defined in claim 1, wherein the cross-linking reaction is a reaction of polymerization, of polycondensation or polyaddition.

14. Polymer material as defined in claim 1, wherein the functional groups of the polysaccharides and/or polypeptides are partly blocked by protective groups prior to the derivatization.

15. Polymer material as defined in claim 1, wherein the agent includes different cross-linkable groups, accessible to different cross-linking reactions.

16. Polymer material as defined in claim 15, wherein said different cross-linkable groups are included in the same molecular chain.

17. Polymer material as defined in claim 1 wherein when said material is incubated in 0.1% HCl at 37° C. with 2% by weight of pepsin, the material completely dissolves within from approximately two hours to approximately seven days.

18. Polymer material as defined in claim 1 wherein when said material is covered by a standardized leaf mold and incubated at 40° C., the material decomposes without residue within a time of the order of magnitude of four weeks.

19. Polymer material as defined in claim 1 wherein said predetermined thickness is between less than roughly 0.1 mm and approximately 0.5 mm.

20. Polymer material as defined in claim 1 used for the packaging of articles.

21. A biodegradable polymer produced by a process comprising the steps of:
   (a) providing a starting material, said starting material comprising a polypeptide;
   (b) at least partially derivatizing said starting material at a reactive group selected from among hydroxyl, amino, imino, thiol, and carboxyl in a non-radical reaction with an agent including cross-linkable groups to form an uncrosslinked reaction product; and
   (c) converting said uncrosslinked reaction product to a biodegradable polymeric reaction product by cross-linking the cross-linkable groups.

22. A biodegradable polymer produced by a process comprising the steps of:
   a. providing a starting material, said starting material comprising at least one polypeptide portion and at least one polysaccharide portion;
   b. at least partially derivatizing said starting material at a reactive group selected from among hydroxyl, amino, imino, thiol, and carboxyl in a non-radical reaction with an agent including cross-linkable groups to form an uncrosslinked reaction product; and
   c. converting said uncrosslinked reaction product to a biodegradable polymeric reaction product by cross-linking the cross-linkable groups.

23. A polymer according to claim 22, said polysaccharide portion and said polypeptide portion being cross-linked with one another.

24. A polymer according to claim 21, wherein said cross-linkable group is linked to a polypeptide chain via a group selected from the group consisting of amino and carboxyl.

25. A polymer according to claim 21, wherein said starting material comprises gelatin.

* * * * *